United States Patent
Hamada

(10) Patent No.: US 10,221,810 B2
(45) Date of Patent: Mar. 5, 2019

(54) DIRECTLY INJECTING GAS VALVE

(71) Applicant: Robert Bosch GmbH, Stuttgart (DE)

(72) Inventor: Raed Hamada, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 317 days.

(21) Appl. No.: 14/687,117

(22) Filed: Apr. 15, 2015

(65) Prior Publication Data

US 2015/0292440 A1    Oct. 15, 2015

(30) Foreign Application Priority Data

Apr. 15, 2014    (DE) .................. 10 2014 207 182

(51) Int. Cl.
*F02M 21/02*    (2006.01)

(52) U.S. Cl.
CPC .... *F02M 21/0272* (2013.01); *F02M 21/0245* (2013.01); *F02M 21/0275* (2013.01); *Y02T 10/32* (2013.01)

(58) Field of Classification Search
CPC ........... F02M 21/0272; F02M 21/0275; F02M 21/0245; Y02T 10/32
USPC ......... 239/533.2, 533.8, 533.9, 533.3, 533.7, 239/585.1–585.2, 533.4, 96, 584, 124, 239/125, 102.1, 102.02; 137/543.21
See application file for complete search history.

(56) References Cited

U.S. PATENT DOCUMENTS

| | | | | |
|---|---|---|---|---|
| 1,828,967 A * | 10/1931 | Hewitt | .................... | F16K 15/02 137/543.21 |
| 5,232,013 A * | 8/1993 | Morris | .................. | F16K 15/063 137/514.7 |
| 6,390,121 B1 * | 5/2002 | Steinruck | ........... | F02M 63/0054 137/514 |
| 2008/0011887 A1 * | 1/2008 | Parish | ................ | F02M 51/0682 239/585.5 |
| 2009/0159729 A1 * | 6/2009 | Yoshimaru | ......... | F02M 51/0682 239/585.1 |
| 2013/0062442 A1 * | 3/2013 | Czimmek | .......... | F02M 51/0667 239/585.1 |

FOREIGN PATENT DOCUMENTS

CN    101463780 A    6/2009

* cited by examiner

*Primary Examiner* — Darren W Gorman
*Assistant Examiner* — Qingzhang Zhou
(74) *Attorney, Agent, or Firm* — Norton Rose Fulbright US LLP; Gerard Messina

(57) ABSTRACT

A gas injector is provided for the direct injection of a gaseous medium into a combustion chamber of an internal combustion engine, which includes an adjustable valve member, a stationary sealing sleeve having a first sealing seat, a movable sealing element having a second sealing seat and a restoring element for resetting the sealing element and the valve member to an initial position, the first sealing seat and the second sealing seat forming a valve seat of the gas injector, and the valve member being disposed in the sealing sleeve.

9 Claims, 5 Drawing Sheets

DIRECTLY INJECTING GAS VALVE

FIELD OF THE INVENTION

The present invention relates to a directly-injecting gas valve for the direct injection of a gaseous medium into a combustion chamber of a combustion engine, and to such a combustion engine.

BACKGROUND INFORMATION

In internal combustion engines, the use of gaseous fuels, such as natural gas or hydrogen, for operating vehicles has been increasing over the past few years. However, the known injectors for liquid fuels are only conditionally suitable for such gaseous fuels, since gaseous fuels have different energy densities and volumes than liquid fuels. In modern gas engines, the gaseous fuel is currently injected into an induction pipe with the aid of an injector. Since low temperatures prevail in the induction pipe, it is possible to use an elastomeric sealing seat for sealing the gas in such injectors. Excellent tightness of the gas injector, in particular, is able to be ensured in this manner. In an effort to improve the economy and fuel consumption of such gas engines, it would be desirable to also have the possibility of injecting the gas directly into a combustion chamber of the gas engine. However, because of the proximity of the gas injector to the combustion chamber, the use of elastomeric sealing seats is impossible since they would be destroyed by the heat generation in the combustion chamber.

SUMMARY

In contrast, the gas injector according to the present invention for the direct injection of gaseous medium into a combustion chamber of an internal combustion engine has the advantage of providing a sealing concept without elastomeric seals and of allowing the gas injector to be positioned directly at the combustion chamber for a direct injection. The gas injector according to the present invention has high temperature resistance and also allows the release of large cross-sections during an injection process, so that short injection cycles and multiple injection cycles are possible as well during a cycle. Furthermore, the gas injector according to the present invention has a relatively small design and a compact structure that is easy to manufacture. In the present invention this is achieved in that the gas injector includes an adjustable valve member and a stationary sealing sleeve having a first sealing seat. In addition, a movable sealing element having a second sealing seat is provided, as is a restoring element for resetting the sealing element and the valve member back to an initial position. The first and second sealing seats form a valve seat of the gas valve, and the valve member is disposed inside the sealing sleeve. To ensure an especially uncomplicated design that is able to be produced in a cost-effective manner, the valve member and the sealing element are preferably disposed only in a loose manner. This two-part development has the particular advantage that a self-alignment is possible during the closing operation of the gas injector.

The restoring element is especially preferably disposed downstream from the valve seat in the flow direction of the gaseous medium through the gas injector. This makes it possible to provide a particularly compact gas injector. Moreover, it is thereby ensured that a slight clearance exists between the valve seat and the hot combustion chamber, so that it is possible, especially with regard to a material selection for the materials of the valve seat, to select a more cost-effective material that need not have the ability to withstand the highest thermal stresses.

Moreover, the gas injector preferably also has a valve housing, which includes a wall region and a bottom region. A prechamber, in which the restoring element is situated, is developed between the valve seat and the bottom region. The restoring element preferably is braced in the bottom region. Openings, through which the gaseous medium is able to exit into the combustion chamber, are provided in the bottom region. The bottom region protects the gas injector from excessive thermal loading.

According to a further preferred development of the present invention, the valve member has a hollow cylindrical body provided with a multitude of lateral through openings. As a result, a gas flow through the interior of the hollow cylindrical body is able to take place, and the gas can be routed via the through openings to an outer periphery of the hollow cylindrical body. Moreover, the through openings are preferably situated on a horizontal peripheral line of the hollow cylindrical body. In addition, a circumferential depression, where the through openings end, is preferably developed along the outer periphery of the hollow cylindrical body.

A throttle is preferably provided between the valve member and the sealing sleeve, and an opening cross-section of the throttle changes when the valve member moves. The opening cross-section of the throttle preferably becomes greater in a movement of the valve member in the opening direction, so that the largest gas quantity possible is able to be injected.

According to a further preferred development of the present invention, the sealing element is a sealing disk, and a flat seat is developed between the sealing disk and the sealing sleeve. This makes it possible to realize a valve seat in a simple and cost-effective manner. For example, the sealing disk can be surface-ground, and the flat seat at the sealing sleeve may be surface-ground as well. The flat-seat system is therefore able to provide metallic sealing. The sealing seat on the sealing sleeve is especially preferably provided at an end face of the sealing sleeve, so that the valve seat extends in in the form of a flat ring between the sealing sleeve and the sealing disk. Through the choice of the sealing inner and outer diameters it is therefore possible to provide a predefined sealing ring surface.

Furthermore, the sealing disk preferably has a multitude of projections at an outer circumference. The projections, for one, are provided in order to prevent tilting of the sealing disk and to provide radial guidance inside the valve housing. For another, adequate free space exists between each projection, so that the gaseous medium to be injected is able to flow past the sealing disk between the projections. This also makes it possible to manufacture the sealing disk in a cost-effective manner since it is not necessary to provide any openings in the sealing disk; instead, the gas flow is able to take place on the outer circumference, at the intermediate spaces between the projections.

A predefined small play in the µm range is preferably provided between the projections of the sealing disk and the valve housing. This makes it possible to align the sealing disk during the closing operation.

According to one alternative preferred development of the present invention, the sealing element is a sphere segment or a solid sphere. Furthermore, the sealing sleeve preferably has a sealing edge or a conical area, which comes into contact with a spherical area segment of the spherical sealing element. The use of the sealing edge ensures line sealing in a simple and cost-effective manner, which provides high tightness. Automatic centering of the spherical sealing element can be achieved in the closing operation when using a conical surface.

In addition, the present invention relates to a gas-operated internal combustion engine having a gas valve according to the present invention, which is situated directly at a combustion chamber of the internal combustion engine. The internal combustion engine is especially preferably used in connection with a vehicle.

DETAILED DESCRIPTION

In the following text, a gas injector 1 according to a first preferred exemplary embodiment of the present invention is described in detail with reference to FIGS. 1 through 4.

Figure 1:
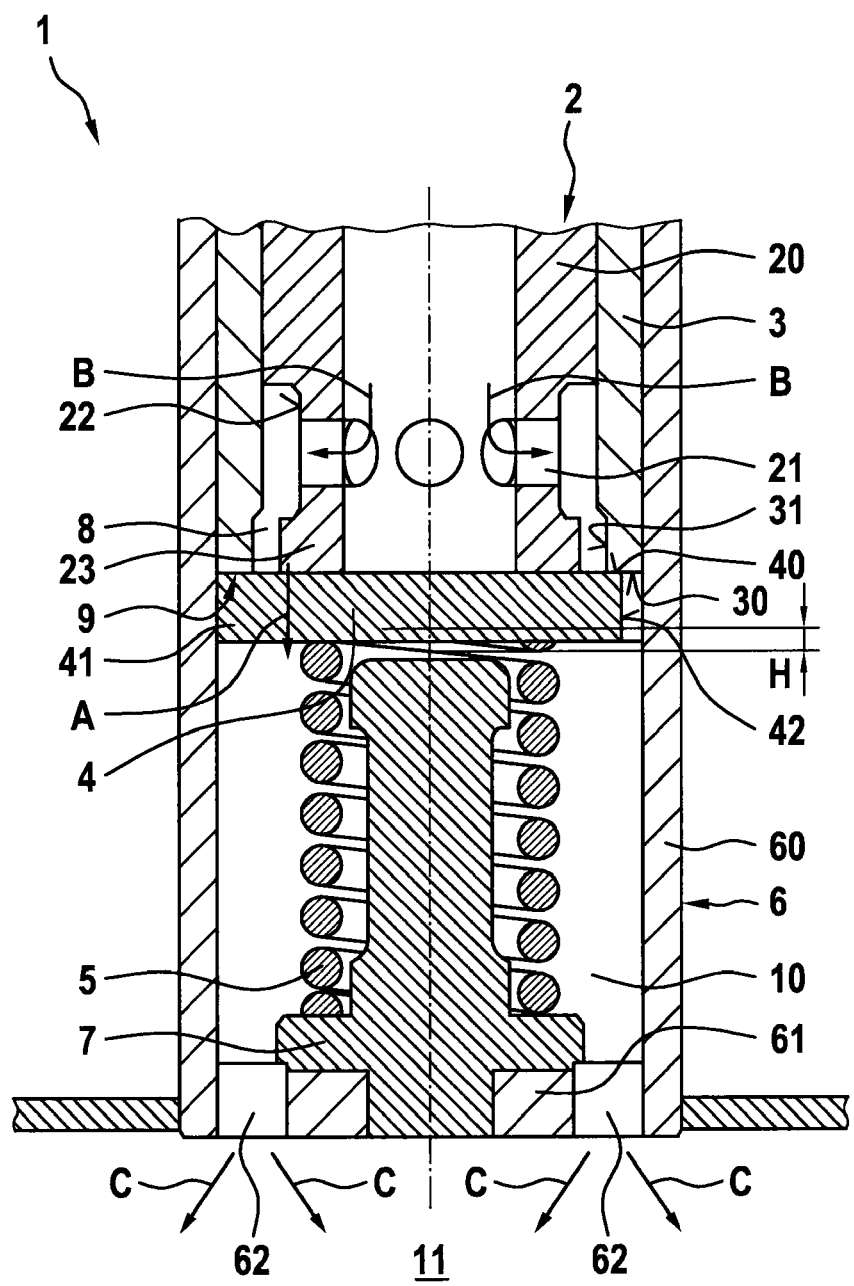
FIG. 1 shows a schematic sectional view of a gas injector according to a first exemplary embodiment of the present invention.

Gas injector 1 for the direct injection of a gaseous fuel into a combustion chamber 11 of an internal combustion engine includes an adjustable valve member 2 and a stationary sealing sleeve 3. In addition, the gas injector is provided with a movable sealing element 4 and a restoring element 5 for returning sealing element 4 and valve member 2 back to the initial position illustrated in FIG. 1. FIG. 1 shows the closed state of the gas injector.

A valve seat 9 is provided between sealing element 4 and stationary sealing sleeve 3. Stationary sealing sleeve 3 has a first sealing seat 30, and movable sealing element 4 has a second sealing seat 40. First sealing seat 30 on the sealing sleeve is provided at a front-side end of the sealing sleeve and may be produced by surface-grinding of sealing sleeve 3, for example. Sealing element 4 of the first exemplary embodiment is a sealing disk, and second sealing seat 40 is provided on a side of the sealing disk that faces in the direction of valve member 2. This side of the sealing disk is preferably surface-ground as well. Thus, an annular surface results as valve seat between the first and second sealing seat 30, 40.

As can be gathered from FIG. 1, a circumferential recess 31 is provided at an inner circumference of sealing sleeve 30 next to first sealing seat 30. This is meant to ensure the largest possible flow cross-section between sealing sleeve 3 and valve member 2.

Figure 2:
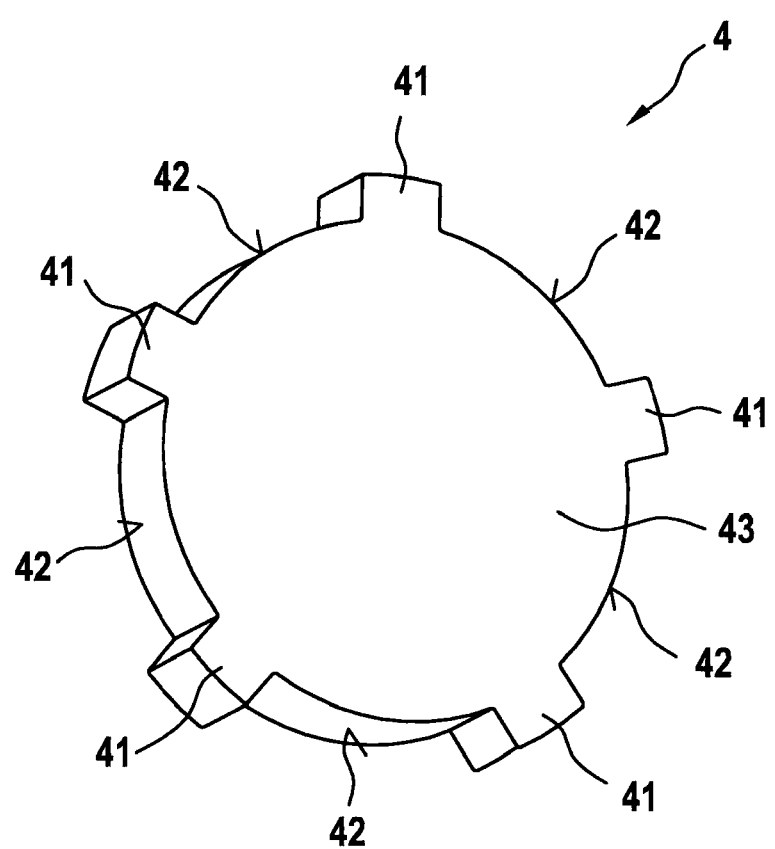
FIG. 2 shows a schematic, perspective view of a sealing element developed in the form of a sealing disk.

Sealing element 4 in the form of the sealing sleeve is shown in detail in FIG. 2. As can be gathered from FIG. 2, the sealing disk has a disk-shaped body 43 made from a solid material, and a multitude of projections 41 is disposed on its outer circumference. Projections 41 radially project from the periphery of disk-shaped body 43. Through regions 42 are developed between adjacent projections 41 in each case. The width of through regions 42 is considerably greater than the width of projections 41 in the circumferential direction. This allows gaseous media to flow through through regions 42 when the gas injector is open.

Figure 3:
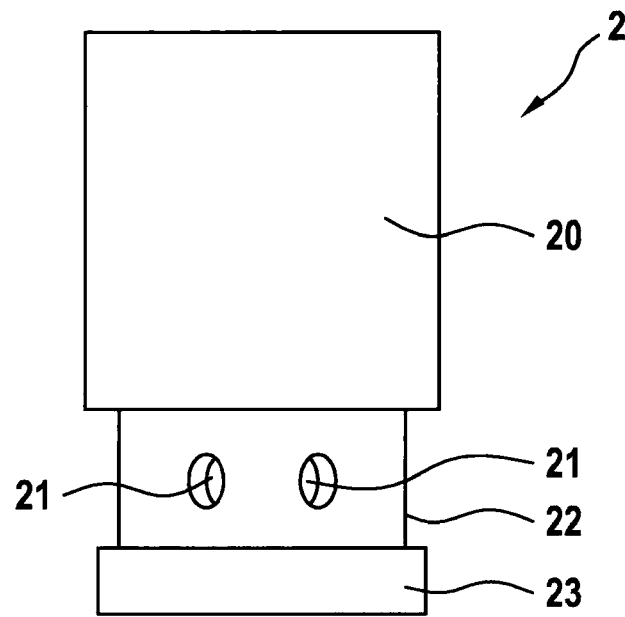
FIG. 3 shows a schematic side view of the valve member of FIG. 1.
Figure 4:
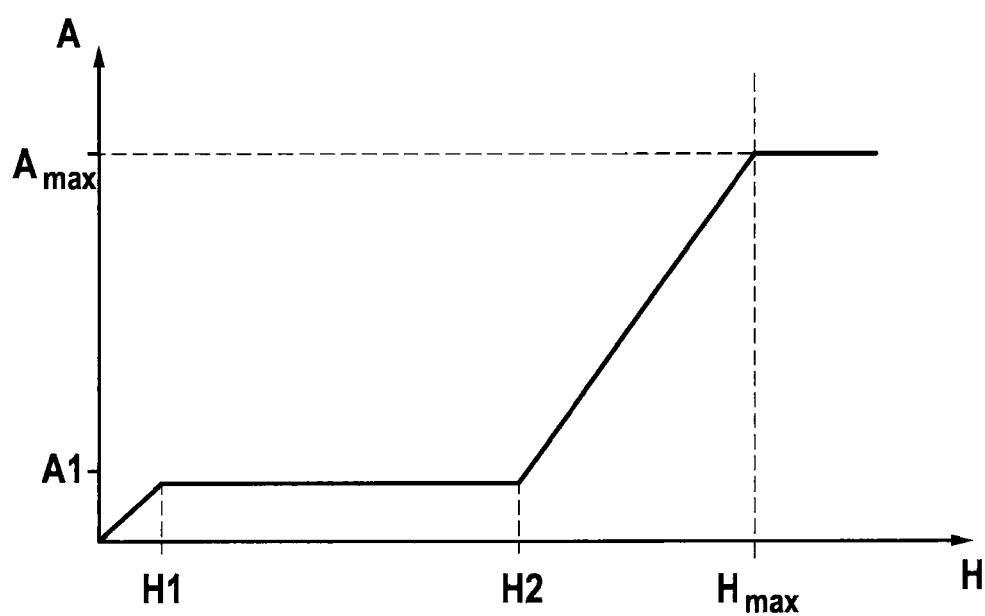
FIG. 4 shows a diagram, which represents an opening cross-section at the valve seat across a lift of the valve member.

Valve member 2 may be seen in detail in FIG. 3. Valve member 2 includes a cylindrical body 20 and a multitude of through openings 21. Through openings 21 extend in the radial direction of valve member 2 and end in a circumferential depression 22, which is developed along an outer periphery of body 20. In addition, a flange 23, whose outer circumference is slightly smaller than an outer circumference of body 20, is developed in an end region of body 20. Gaseous medium, which flows from the interior of body 20 via through openings 21 to the outer circumferential side of valve member 2, is thereby able to be guided past flange 23 (see FIG. 1).

In addition, gas injector 1 includes a sleeve-shaped valve housing 6, which includes a wall region 60 and a bottom region 61. A multitude of discharge openings 62 is formed in bottom region 61.

Moreover, gas injector 1 includes a stop 7, which is braced in bottom region 61 of valve housing 6. Stop 7 delimits a maximum lift H (see FIG. 1) of sealing element 4. In addition, stop 7, which is braced in bottom region 61, also stabilizes restoring element 5. Restoring element 5 of this exemplary embodiment is developed as a cylindrical helical spring.

Stop 7 and restoring element 5 are disposed in a prechamber 10, which is formed in the end region of the end of the valve housing that is pointing in the direction of the combustion chamber. Prechamber 10 provides a certain clearance between valve seat 9 and combustion chamber 11, so that the temperatures in the region of valve seat 9 are not as high as directly in the wall region of combustion chamber 11.

In addition, a throttle 8 is provided, which is situated between sealing sleeve 3 and valve member 2. Throttle 8 has an opening cross-section that enlarges when the gas injector is opened. As can be gathered from FIG. 4, the geometrical form of throttle 8 is selected in such a way that a small gas quantity is allowed to pass via the released small cross-section A1 given a small lift travel H1, and the opening cross-section and the gas quantity rise in linear fashion only after a predefined lift H2 has been accomplished. Only after the lift of sealing element 4 is restricted ($H_{max}$) by striking stop 7, the maximal gas quantity is able to pass at maximum opening cross-section $A_{max}$. As a result, the use of the gas injector according to the present invention also allows an uncomplicated injection of minimal quantities when a gas injector is not fully open (in the range between H1 and H2).

The gas injector according to the present invention functions in the following manner. Using an actuator (not shown), such as a solenoid actuator or a piezo actuator, valve member 2 is moved in the direction of arrow A. Sealing element 4 rests at the end face against flange region 23 of valve member 2 and is moved counter to the spring force of restoring element 5 together with valve member 2, which opens valve seat 9. Gaseous medium in the interior region of hollow cylindrical valve member 2 is thereby able to flow toward through openings 21, through them (arrow B) via throttle 8 into prechamber 10, and from there (arrows C), into combustion chamber 11.

After the injection has taken place, the actuator is deactivated, so that restoring element 5 is able to reset sealing element 4 and valve member 2 back to the initial position illustrated in FIG. 1. Sealing element 4 is situated in valve housing 6 with radial play in the μm range with respect to valve housing 6, so that slight tilting of sealing element 4 is possible as well. During the restoring operation of sealing element 4, it is therefore able to execute slight compensatory movements, so that an alignment can take place when sealing element 4 strikes first sealing seat 30 of sealing sleeve 3, and planar contact of second sealing seat 40 of sealing element 4 is possible at first sealing seat 30 of sealing sleeve 3.

In the first exemplary embodiment it is therefore the case that a flat sealing seat is developed between sealing element 4 and sealing sleeve 3, which is able to be obtained by simple and cost-effective surface grinding of sealing element 4 on the one hand, and of front-side sealing seat 30 on sealing sleeve 3 on the other. Depending on the depth of the recess 31 on sealing sleeve 3, a sealing area of valve seat 9 can also be defined in this way, so that recesses 31 of different depths for different application cases are able to be provided on sealing sleeve 3. In addition, the throttle effect of throttle 8 is also definable by the geometrical development of recess 31.

In addition, it is no longer important to maintain coaxialities and curvature tolerances for the seal. Planar sealing seats 30, 31 are able to be produced in a relatively simple manner. Moreover, because of the large piercing area, there is greater wear resistance and a certain insensitivity with regard to the high pressure prevailing in the combustion chamber.

Figure 5:
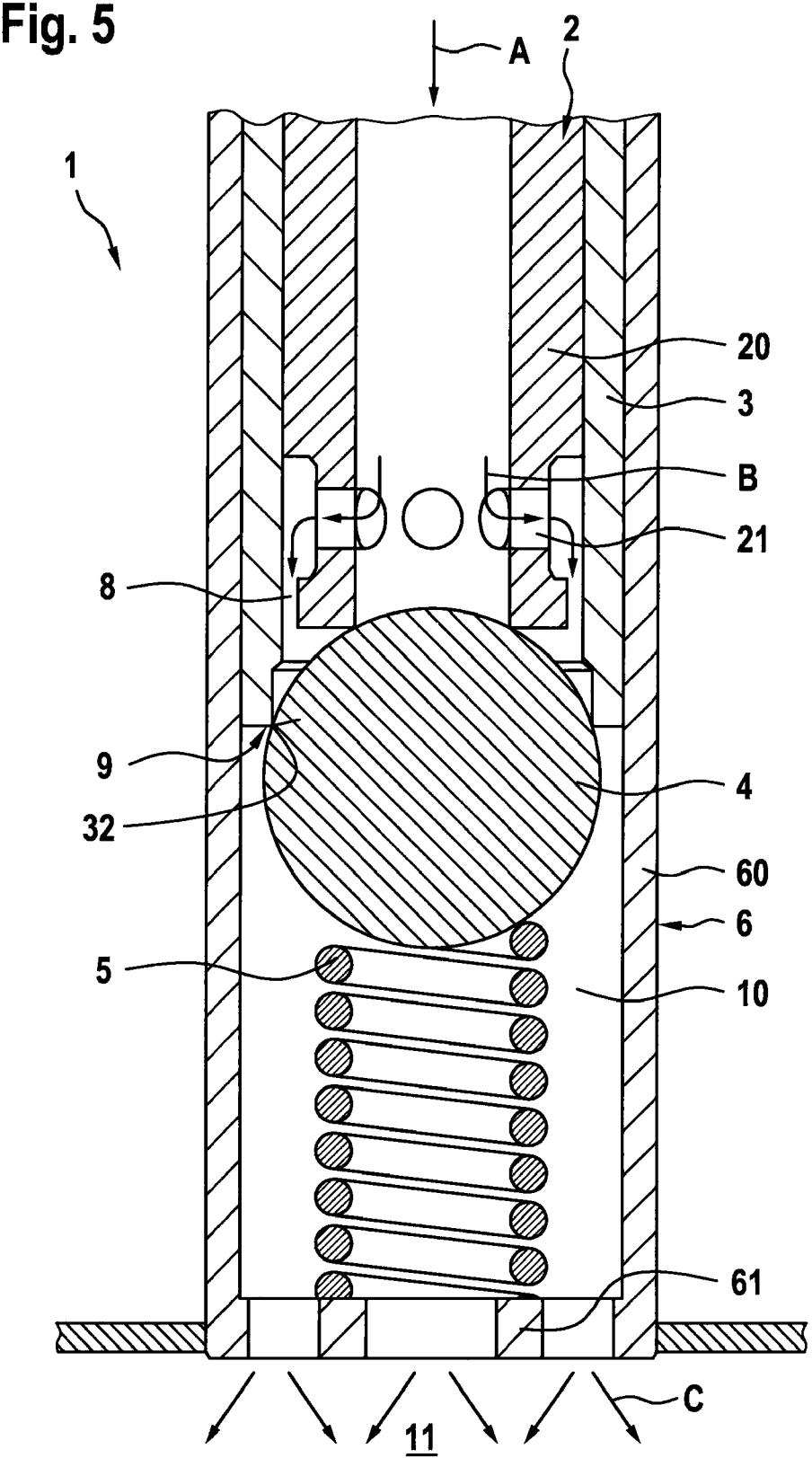
FIG. 5 shows a schematic sectional view of a gas injector according to a second exemplary embodiment of the present invention.
Figure 6:
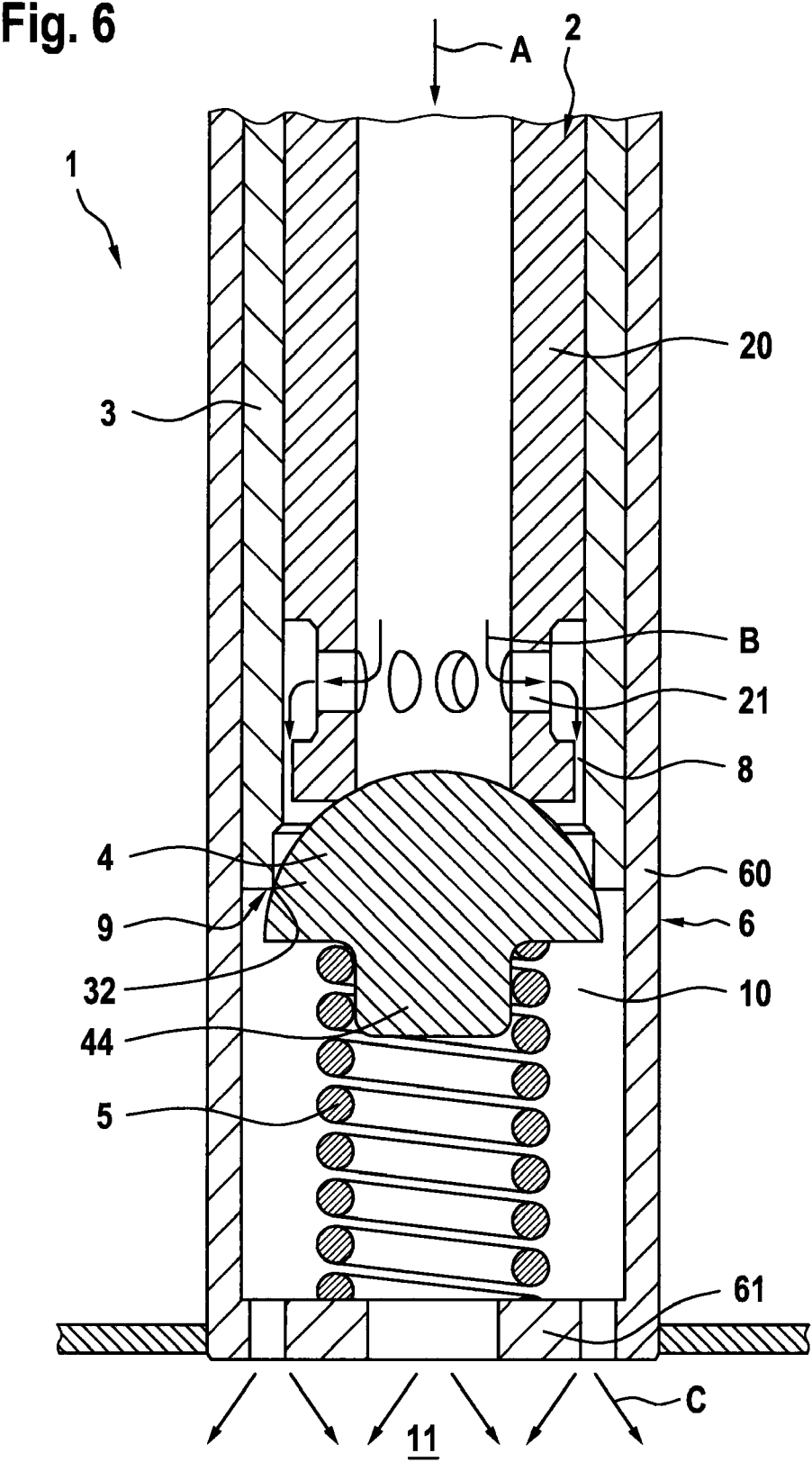
FIG. 6 shows a schematic sectional view of a gas injector according to a third exemplary embodiment of the present invention.

FIG. 5 shows a gas injector 1 according to a second exemplary embodiment of the present invention. In the second exemplary embodiment, a full sphere is provided as sealing element 4. The full sphere seals at an annular edge 32 of sealing sleeve 3 extending at the inner circumference. This makes surface grinding of sealing sleeve 3 unnecessary and also provides especially reliable sealing with respect to high gas pressures.

The third exemplary embodiment shown in FIG. 3 has a similar structure as the second exemplary embodiment and has a hemisphere as sealing element 4. The hemisphere also includes a lug 44 for centering restoring element 5.

What is claimed is:

1. A gas injector for a direct injection of a gaseous medium into a combustion chamber of an internal combustion engine, comprising:
   an adjustable valve member;
   a stationary sealing sleeve having a first sealing seat;
   a movable sealing element having a second sealing seat; and
   a restoring element for restoring the sealing element and the valve member to an initial position, wherein:
      the first sealing seat and the second sealing seat form a valve seat of the gas injector,
      the valve member is situated in the sealing sleeve,
      the sealing element is a sealing disk, a flat seat is developed between the sealing disk and the sealing sleeve, and the sealing disk has a plurality of projections at an outer circumference, and
      the restoring element is situated downstream from the valve seat in a flow direction of the gaseous medium through the gas injector;
   wherein the valve member includes a hollow cylindrical body including lateral through openings, and
   wherein:
      the through openings are situated on a horizontal circumferential line of the hollow cylindrical body, and
      a circumferential depression is developed at an outer circumference of the hollow cylindrical body, at which the through openings terminate.

2. The gas injector as recited in claim 1, further comprising:
   a valve housing having a wall region and a bottom region; and
   a prechamber developed between the valve seat and the bottom region and in which the restoring element is situated.

3. The gas injector as recited in claim 1, further comprising:
   a throttle provided between the valve member and the sealing sleeve, wherein an opening cross-section of the throttle varies when the valve member moves.

4. The gas injector as recited in claim 3, wherein the throttle enlarges when the valve member moves.

5. The gas injector as recited in claim 1, wherein:
   the first sealing seat on the sealing sleeve is provided at an end face of the sealing sleeve, and
   an annular surface is developed as the valve seat between the sealing sleeve and the sealing disk in a closed state of the gas injector.

6. The gas injector as recited in claim 1, further comprising:
   a valve housing having a wall region and a bottom region, wherein a predefined small play in a μm range is provided between the projections and the valve housing in order to allow an alignment of the sealing disk during a closing operation.

7. A gas-operated internal combustion engine, comprising:
   a gas injector for a direct injection of a gaseous medium into a combustion chamber of the internal combustion engine, the gas injector including:
      an adjustable valve member;
      a stationary sealing sleeve having a first sealing seat;
      a movable sealing element having a second sealing seat; and
      a restoring element for restoring the sealing element and the valve member to an initial position, wherein:
         the first sealing seat and the second sealing seat form a valve seat of the gas injector,
         the valve member is situated in the sealing sleeve,
         the sealing element is a sealing disk, a flat seat is developed between the sealing disk and the sealing sleeve, and the sealing disk has a plurality of projections at an outer circumference,
         the gas injector is situated directly at the combustion chamber, in order to inject the gaseous medium directly into the combustion chamber, and
         the restoring element is situated downstream from the valve seat in a flow direction of the gaseous medium through the gas injector;
   wherein:
      the valve member includes a hollow cylindrical body including lateral through openings,
      the through openings are situated on a horizontal circumferential line of the hollow cylindrical body, and
      a circumferential depression is developed at an outer circumference of the hollow cylindrical body, at which the through openings terminate.

8. The gas injector as recited in claim 1, wherein the adjustable valve member and the movable sealing element are separate components.

9. The gas injector as recited in claim 8, wherein the adjustable valve member and the movable sealing element are capable of moving relative to each other.

* * * * *